United States Patent
Li et al.

(10) Patent No.: US 12,273,317 B1
(45) Date of Patent: Apr. 8, 2025

(54) IP CLASSIFICATION

(71) Applicant: Conviva Inc., Foster City, CA (US)

(72) Inventors: Yan Li, Foster City, CA (US); Xi Xiong, San Jose, CA (US); Yasar Arafath Rafi Ahmed, Tirupur District (IN)

(73) Assignee: Conviva Inc., Foster City, CA (US)

( * ) Notice: Subject to any disclaimer, the term of this patent is extended or adjusted under 35 U.S.C. 154(b) by 0 days.

(21) Appl. No.: 18/915,880

(22) Filed: Oct. 15, 2024

Related U.S. Application Data

(60) Provisional application No. 63/591,604, filed on Oct. 19, 2023.

(51) Int. Cl.
*H04L 9/40* (2022.01)
*H04L 61/5007* (2022.01)

(52) U.S. Cl.
CPC ................ *H04L 61/5007* (2022.05)

(58) Field of Classification Search
None
See application file for complete search history.

(56) References Cited

U.S. PATENT DOCUMENTS

| | | | |
|---|---|---|---|
| 8,311,956 B2 | 11/2012 | Sen | |
| 10,187,413 B2 | 1/2019 | Vasseur | |
| 11,010,789 B1* | 5/2021 | Griggs | H04L 61/5007 |
| 11,258,754 B1* | 2/2022 | Griggs | H04L 61/106 |
| 11,627,109 B2* | 4/2023 | Dahlberg | H04L 61/4505 709/245 |
| 11,631,015 B2 | 4/2023 | Matlick | |
| 11,689,944 B2 | 6/2023 | Vasudevan | |
| 11,874,937 B2 | 1/2024 | Gentleman | |
| 2019/0251585 A1* | 8/2019 | Milton | G06F 16/9537 |
| 2021/0073661 A1* | 3/2021 | Matlick | H04L 61/3025 |
| 2021/0320934 A1* | 10/2021 | Wosotowsky | H04L 63/1425 |

\* cited by examiner

*Primary Examiner* — Christopher B Robinson
(74) *Attorney, Agent, or Firm* — Van Pelt, Yi & James LLP

(57) ABSTRACT

A set of Internet Protocol (IP) addresses is received wherein each IP address is associated with a corresponding set of features. For an IP address in the set, the IP address is evaluated based at least in part on a set of inclusion criteria. For the IP address in the set, a likelihood that the IP address is residential or non-residential is generated based at least in part on the corresponding set of features and the evaluation of the IP address based at least in part on the set of inclusion criteria. For the IP address in the set, a training sample is generated that includes the IP address, at least some of the corresponding set of features, and a label. A labeled training data set is output that includes the training sample, where an IP address classifier is trained using the labeled training data set.

20 Claims, 8 Drawing Sheets

IP CLASSIFICATION

CROSS REFERENCE TO OTHER APPLICATIONS

This application claims priority to U.S. Provisional Patent Application No. 63/591,604 entitled IP CLASSIFICATION filed Oct. 19, 2023 which is incorporated herein by reference for all purposes.

BACKGROUND OF THE INVENTION

With the ever-increasing exchange of content (or, more generally, data) using the Internet Protocol (IP), the ability to properly and/or accurately label, characterize, and/or classify IP-related data and/or metadata (or, more generally, IP-related information) is important. For example, downstream decisions, databases, and/or data sets may be generated from the classified IP-related information, and the size and quality of those downstream products will depend upon the quality or accuracy of the classification. Although techniques exist to classify IP-related information, new techniques that further improve the quality of the classification would be desirable. New techniques which improve the quality of IP-related classifications and which in turn produce downstream products that are more accurate and/or that are smaller and require less storage space would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of techniques to generate a labeled training data set are described herein. In some embodiments, a labeled training data set is subsequently used to train an Internet Protocol (IP) address classifier. Once trained, the trained IP address classifier may be used to assign classifications (e.g., decisions) of whether an input IP address is residential or non-residential (e.g., based on a corresponding set of features for that IP address). The following figure illustrates an example process to generate a labeled training data set.

Figure 1:
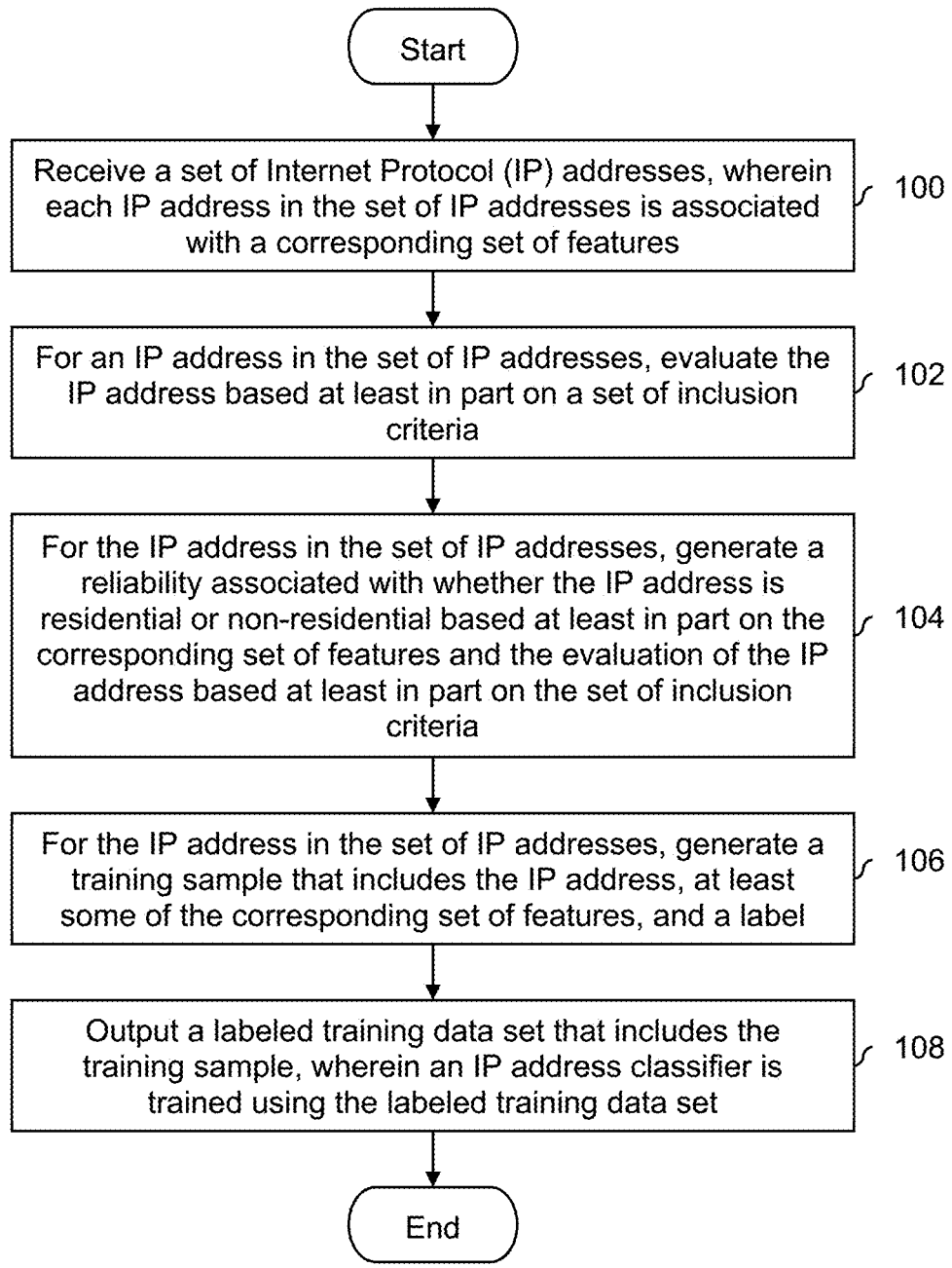
FIG. 1 is a flowchart illustrating an embodiment of a process to output a labeled training data set which is used to train an Internet Protocol (IP) address classifier.

FIG. 1 is a flowchart illustrating an embodiment of a process to output a labeled training data set which is used to train an Internet Protocol (IP) address classifier. In some embodiments, the process of FIG. 1 is performed by a (e.g., general purpose) processor or computer program product (e.g., embodied in a non-transitory computer readable medium) that generates and/or outputs a labeled training data set.

At 100, a set of Internet Protocol (IP) addresses is received, wherein each IP address in the set of IP addresses is associated with a corresponding set of (e.g., one or more) features. For brevity, a "set of IP addresses" and "corresponding set of features" are sometimes referred to herein simply as "IP addresses" or "features."

An Internet Protocol (IP) address is a numerical label or identifier that is assigned to a router via which one or more connected devices (e.g., a smartphone, tablet, laptop, computer, gaming device, etc.) exchange data with other devices on a network beyond the router. The IP address is used to exchange communications, traffic, and/or packets throughout the network. For example, an IP packet may contain the IP address of the sending host (device) and the IP address of the destination host (device) in the header of the IP packet.

The format of an IP address depends upon the version of the IP Protocol used. For Internet Protocol version 4 (IPv4), IP addresses are a 32-bit number or value (e.g., 0.0.0.0 through 255.255.255.255 using base 10 digits). For Internet Protocol version 6 (IPv6), IP addresses are a 128-bit number or value (e.g., 0000:0000:0000:0000:0000:0000:0000:0000 through ffff:ffff:ffff:ffff:ffff:ffff:ffff:ffff using hexadecimal digits). Some IP addresses are designated as private (e.g., 10.x.x.x, 192.168.x.x for IPv4 and fc00::/7 for IPv6, etc.) and others are designated as public. In examples described herein, private IP addresses are not considered in this classification process and are excluded. In the following description(s), an IP address means only public IP addresses unless explicitly specified otherwise.

In some embodiments, the set of IP addresses that are received or otherwise input at step 100 includes IP addresses that are obtained from historic and/or past IP traffic. For example, if the to-be-trained IP address classifier is intended to classify traffic on a particular content delivery network or platform (e.g., associated with and/or managed by Conviva Inc.), then historic IP traffic exchanged over that content delivery network or platform may be obtained and the IP addresses that are input or otherwise received at step 100 may be extracted or otherwise obtained from that historic IP traffic.

In some embodiments, the features are also obtained or otherwise extracted from the same historic IP traffic used to obtain the IP addresses. In general, features comprise or otherwise include information and/or metadata associated with an IP address. More detailed examples of features are described below.

Returning to FIG. 1, at 102, for an IP address in the set of IP addresses, the IP address is evaluated based at least in part on a set of (e.g., one or more) inclusion criteria.

Although the term "inclusion criteria" is used in this example and other examples described herein, some other embodiments may use or recite exclusion criteria. Conceptually, inclusion criteria and exclusion criteria are opposite sides of the same coin and the techniques described herein are applicable to both inclusion criteria and exclusion criteria.

It is noted that a naive approach may use all input IP addresses and/or features (e.g., input or otherwise referred to at step 100) without excluding or otherwise filtering out some inputs. In contrast, this technique takes a more selective approach that tends to filter out at least some data from the labeled training data set, hence the usage of inclusion criteria. More detailed examples of inclusion (exclusion) criteria are described below.

At 104, for the IP address in the set of IP addresses, a reliability associated with whether the IP address is residential or non-residential is generated based at least in part on the corresponding set of features and the evaluation of the IP address based at least in part on the set of inclusion criteria. For example, the reliability may be a likelihood, confidence, and/or certainty value about whether a label or decision (whether a given IP address is residential vs. non-residential) is correct. In some embodiments, the reliability that is generated at 104 is a value within a range from 0% to 100%.

In some embodiments, if the evaluation of the IP address (at step 102) indicates that the inclusion criteria is not satisfied, then that IP address is excluded from the labeled training data set and/or no reliability value is generated for that IP address.

In some embodiments, a reliability that is generated at 104 is separate from a second (e.g., label) value that represents a decision or classification about whether an IP address is residential or non-residential. For example, in some embodiments, a binary decision or classification (e.g., residential or non-residential) is also generated in addition to a (e.g., separate) reliability value.

Alternatively, in some embodiments, a reliability that is generated at 104 is embedded or intertwined with a decision or label (e.g., about whether an IP address is residential or non-residential) in a single value or data object. For example, the value generated at 104 may range from −1 to 1 where the magnitude corresponds to reliability (e.g., a larger magnitude indicates less reliability or certainty) and the sign corresponds to a decision or classification (e.g., negative=residential; positive=non-residential). This range of values between −1 and 1 and assignment of signs and magnitudes to meanings are merely exemplary and are not intended to be limiting. In some embodiments, a reliability and/or label has some other range, such as −1 to 1, 0 to ∞, etc. and/or some other associated meanings.

In this example, a reliability is not necessarily generated at step 104 for every IP address that is received or input at step 100. In some embodiments, the inclusion criteria describe one or more criteria, standards, tests, and/or thresholds to evaluate whether (e.g., Yes nor No) a reliability is generated and/or to what degree its corresponding features are used to generate the reliability. A more detailed example of inclusion criteria is described below.

In some embodiments, features (e.g., one or more of those recited in step 100) are used to generate a reliability. Examples of features and generation of a reliability value are described in more detail below.

At 106, for the IP address in the set of IP addresses, a training sample is generated that includes the IP address, at least some of the corresponding set of features, and a label.

In some embodiments, a label that is generated at step 106 includes a decision or classification about whether that IP address is residential or non-residential, as well as the reliability value that is generated at step 104.

In one example of how a label is generated at step 106, viewer identifiers and public IP address pairs (e.g., (viewer identifier, public IP address)) from a (e.g., separate or otherwise) data source are used to generate the labels in the labeled training data set. In some embodiments, a viewer identifier is treated as equivalent to a subscription or subscriber identifier. For example, if a public IP address is used by 100 different viewers (subscribers), then it is more likely to be a non-residential IP address, and the count or number of viewers (subscribers) for a public IP address is used to generate a label. In a "hard decision" example, pairs of viewers (subscribers) and public IP addresses are generated, then the pairs are sorted or grouped by public IP address, and then the number of pairs for a given public IP address is counted. If (at least in this hard decision example) the count for that public IP address exceeds 100 (or some other threshold), then a (hard decision) label of non-residential is assigned to that public IP address.

It is noted that the public IP address is the publicly available or advertised IP address; examples that are described herein which refer simply to an "IP address" may be interpreted to mean the public IP address if the private IP is not known.

In some embodiments, steps 102, 104, and 106 are repeated for other IP addresses in the set of IP addresses (e.g., received at step 100) where the training samples for the other IP addresses are also included (e.g., if appropriate, based on the inclusion criteria) in the labeled training data set.

At 108, a labeled training data set is output that includes the training sample, wherein an IP address classifier is trained using the labeled training data set.

It may be helpful to illustrate an example system which performs the techniques described herein within the context of an example usage scenario. The following figures illustrate such an example.

Figure 2A:
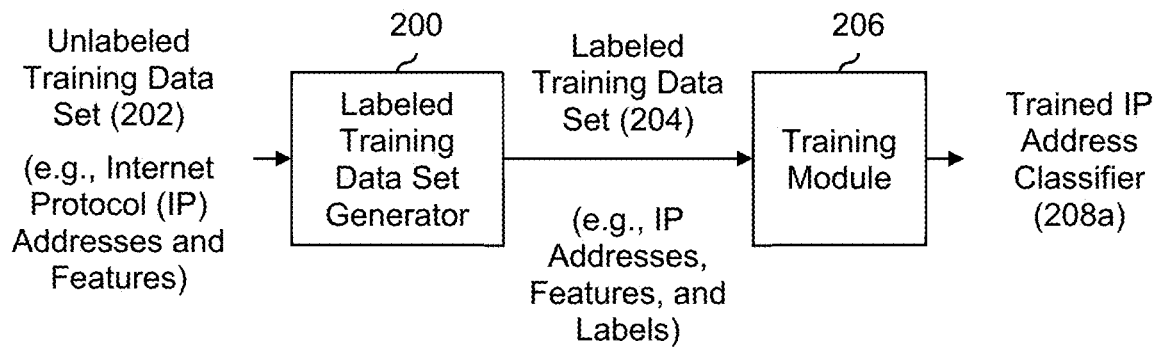
FIG. 2A is a diagram illustrating an embodiment of a system that includes a labeled training data set generator and training module which produce a trained IP address classifier.

FIG. 2A is a diagram illustrating an embodiment of a system that includes a labeled training data set generator and training module which produce a trained IP address classifier. In this example, the labeled training data set generator (200) is an example of a system or device that performs the process of FIG. 1.

In this example, an unlabeled training data set (202), which in this example includes (e.g., unlabeled and/or unclassified) IP addresses and (value(s) for) features, is input into the labeled training data set generator (200). In FIG. 1, for example, this corresponds to step 100.

In some cases, one of the features is unobtainable, unavailable, and/or not applicable for an IP address in the unlabeled training data set (202). In some such embodiments, a corresponding or representative value (e.g., NULL, a zero value, a minimum value, a maximum value, etc.) is used for or to indicate an unobtainable, unavailable, and/or not applicable feature. More detailed examples of features are described in more detail below.

The labeled training data set generator (200) outputs a labeled training data set (204), for example, by performing the process of FIG. 1. In this example, the labeled training data set (204) that is output includes IP addresses (which may not necessarily include all of the IP addresses that were input by the labeled training data set generator (200)), (value(s) for) features (which similarly may not necessarily include features for any filtered-out or excluded IP addresses), and a label (e.g., whether that IP address is residential or non-residential and/or a reliability for the IP address).

The labeled training data set (204) is input into the training module (206) and is used to train an IP address classifier and output a trained IP address classifier (208a). In some embodiments, the training module (206) uses regularizing gradient boosting (e.g., eXtreme Gradient Boosting (XGBoost)) to perform the training. This type of regression and/or training is merely exemplary and is not intended to be limiting; any appropriate type of training may be employed.

In some embodiments, the training module (206) uses a variable, adjustable, and/or dynamic threshold to perform the training. For example, suppose that the labels in the labeled training data set (204) are values ranging between 0 and 1 and the labeled training data set (204) contained an imbalanced or uneven distribution of these between-0-and-1 values so that a default and/or fixed threshold of 0.5 would result in too many misclassifications (i.e., poor training). To counter this, in some embodiments, the training module (206) uses a (e.g., dynamic) threshold that is obtained using a Precision-Recall (PR) curve and a validation data set. To put it another way, a validation data set may be used to obtain an optimized (dynamic) threshold which in turn is used by the training module (206) to perform the training.

Once the trained IP address classifier (208a) is available or otherwise ready, it may be used to classify current and/or newer IP addresses. The following figure shows an example of this.

Figure 2B:
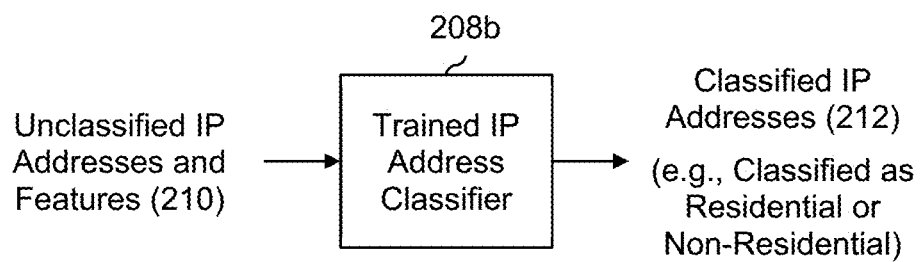
FIG. 2B is a diagram illustrating an embodiment of a trained IP address classifier that outputs classified IP addresses.

FIG. 2B is a diagram illustrating an embodiment of a trained IP address classifier that outputs classified IP addresses. FIG. 2B continues the example of FIG. 2A. In this example, the trained IP address classifier (208b) inputs (e.g., new) unclassified IP addresses and (value(s) for) features (210) and outputs classified IP addresses (212) that are classified as residential or non-residential.

It is noted that the unclassified IP addresses and features (210) that are input in the example of FIG. 2B do not necessarily match those that are in the unlabeled training data set (202) in FIG. 2A. For example, the IP addresses in data set 210 in FIG. 2B may be a newer and/or more recent collection of IP addresses compared to data set 202 in FIG. 2A. Similarly, features in data set 202 that were deemed to be poor candidates for training (e.g., associated with a sparsely-used IP address which in turn produces an inaccurate and/or weak label of residential vs. non-residential) may be present in data set 202 (input by the labeled training data set generator (200)) but may not necessarily be present in the data set 210 (input by the trained IP address classifier (208b)).

As is shown in this example, in some embodiments, an IP address classifier is trained (e.g., by training module (206)) using a labeled training data set (e.g., 204) to become a trained IP address classifier (e.g., 208a/208b) and the trained IP address classifier (e.g., 208b) inputs a second set of unclassified IP addresses (e.g., 210) and outputs a second set of classified IP addresses (e.g., 212).

The classified IP addresses (212) that are output by the trained IP address classifier (208b) may in turn be used by a downstream process. The following figure shows an example of this.

Figure 2C:
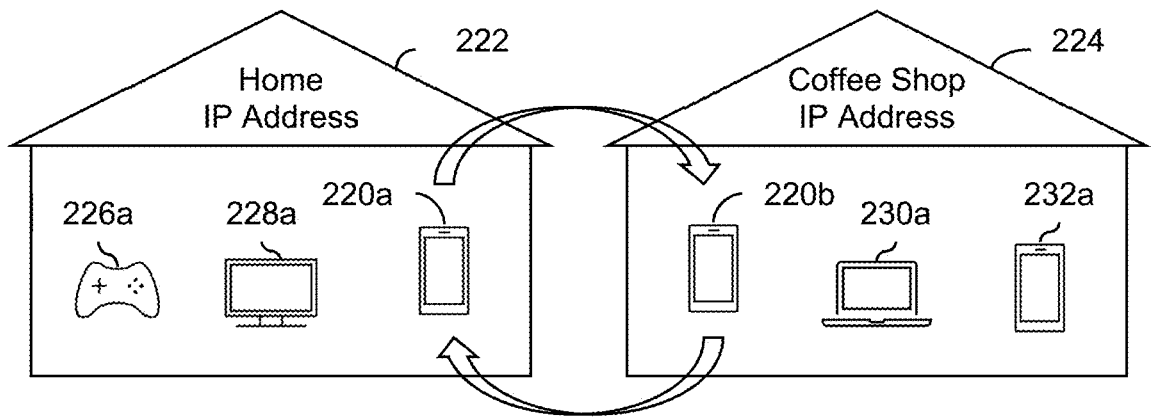
FIG. 2C is a diagram illustrating an embodiment of classified IP addresses that are used to generate household groups.
Figure 2C:
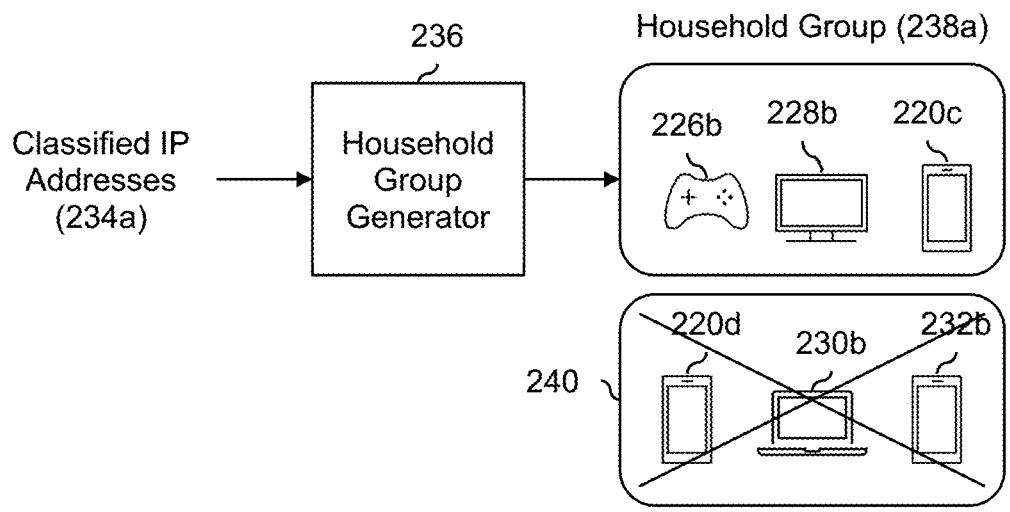
Figure 2C:
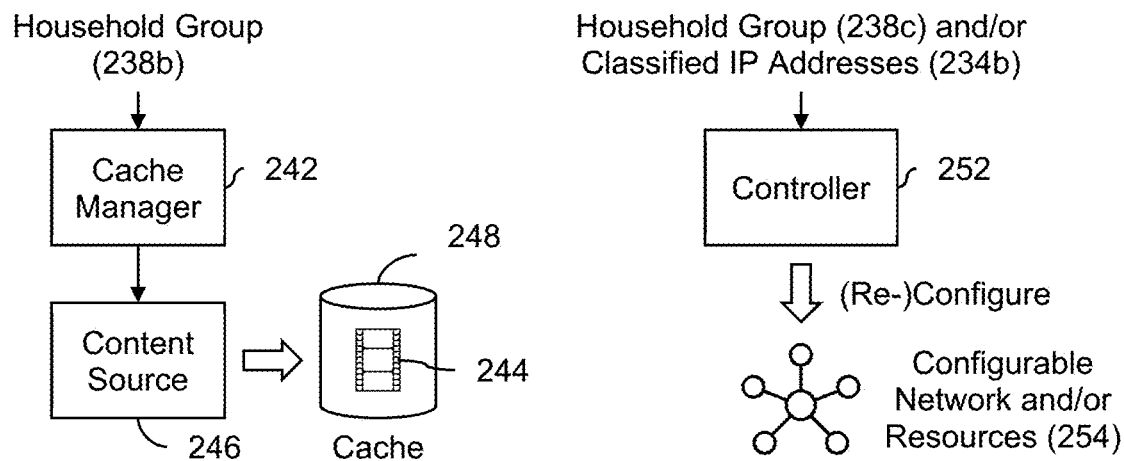

FIG. 2C is a diagram illustrating an embodiment of classified IP addresses that are used to generate household groups. In this example, a user of a smartphone (220a/220b) uses their device at home (which is associated with a home IP address (222)) as well as at a coffee shop (which is associated with a coffee shop IP address (224)). At home, other devices besides the smartphone (220a) use the home IP address (222), including a (e.g., network-accessible and/or network-communicable) gaming device (226a) as well as a connected TV (228a).

Similarly, at the coffee shop, other devices besides the smartphone (220b) use the coffee shop IP address (224), including a laptop (230a) and another smartphone (232a), both of which are owned by employees or other patrons of the coffee shop who are not related to or otherwise affiliated with the owner of the (first) smartphone (220a/220b).

Information associated with these exemplary IP addresses (222 and 224), these devices (220a/220b and 226a-232a), and/or information (e.g., IP traffic) that is sent to and/or received from these devices (220a/220b and 226a-232a) is/are collected or otherwise recorded. For example, IP traffic, packets, frames, (established) sessions, or other exchanged information may be collected. From this collected information, (value(s) for) features which are used to classify the home IP address (222) and coffee shop IP address (224) are obtained.

To put FIG. 2C in context with FIG. 2B, the trained IP address classifier (208b) in FIG. 2B may classify the home IP address (222) and the coffee shop IP address (224) from FIG. 2C based on features for those IP addresses and output classifications of residential for the home IP address (222) and non-residential for the coffee shop IP address (224).

Classified IP addresses (234a), including the classification of residential for the home IP address (222) and non-residential for the coffee shop IP address (224), are input by a household group generator (236). In this example, the household group generator (236) creates clusters or groups of devices that are believed to belong to the same (e.g., residential) household. For example, the devices in one of these created household groups are believed (e.g., by the household group generator (236)) to belong to members of a family or roommates living together. In this example, the household group generator (236) creates a household group (238a) that includes the gaming device (226b), the connected TV (228b), and smartphone (220c), all of which are associated with the home IP address (222).

Conversely, because the coffee shop IP address (224) is classified as non-residential, the household group (238a) does not include the other devices associated with the coffee shop IP address (224), nor does the household group generator (236) create a (second) household group (240) that includes the (first) smartphone (220d), the laptop (230b), and second smartphone (232b) based on non-residential classification of the coffee shop IP address (224).

In this example, the household group generator (236) groups or otherwise clusters devices together. In some other embodiments, a household group generator groups together other things such as users, subscribers, or clients (e.g., where a (device) client may be a software installation on a device associated with an application, a mobile app, and/or an Internet browser application; each client is associated with an installation identifier, referred to herein as a client identifier (clientID)). Also, for simplicity and to preserve the readability of the figure, other information (e.g., in addition to the classified IP addresses) which the household group generator (236) may use to create household groups (or not) is not shown in this example. Depending upon the implementation of the household group generator (236), appropriate information is passed to the household group generator (236).

The techniques described herein improve the performance of a (e.g., computer) system in a variety of ways. For example, the classifications (e.g., 234a) which are more accurate than before may in turn produce smaller household groups (e.g., 238a) and therefore less storage space is required to store the household group information. For example, some other techniques may produce a less accurate IP address classifier which in turn erroneously classifies the coffee shop IP address (224) as being residential. If this incorrect classification were passed to the household group generator (236), an inaccurate household group (240) consisting of the (first) smartphone (220d), the laptop (230b), and second smartphone (232b) would be created and need to be stored. This is an unnecessary and wasteful use of storage resources, which may be a limited and/or finite resource.

Another way in which the techniques described herein improve the performance of the (e.g., computer) system is by producing more accurate household group information which in turn may be used to make better cache management decisions, including what to cache, how long to let content persist in a cache, cache size allocated for a given household or other group, etc. For example, suppose the devices in the home (226a, 228a, and 220a) request content which is stored in a content source (246) and which may (sometimes) be available in a cache (248). Household group information (238b) is passed to a cache manager (242). The cache manager (242) uses the household groups (and possibly other information) to decide content to move over from the content source (246) to a cache (248), in anticipation of a request from a device in the home (e.g., 226a, 228a, or 220a). If the cached content (244) is requested by a device in the home (e.g., 226a, 228a, or 220a), then the content will be able to be delivered faster than if the content were coming from the content source (246). By generating more accurate IP address classifications, more accurate household groups can be created, which in turn enables better (e.g., a higher cache hit rate) decisions about what to cache.

Yet another way in which the techniques described herein improve the performance of the (e.g., computer) system is by producing more accurate information which in turn may be used to make better decisions about a configurable network and/or the resources. For example, household group information (238c) and/or classified IP addresses (234b) are passed to a controller (252) which uses this information to (re-)configure a configurable network and/or allocate resources (254). For example, more processors or other resources (e.g., which respond to requests, provide content, etc.) may be allocated for certain types of IP addresses, or for household groups with more devices or users. Or, the topology and/or distribution of resources (e.g., local and/or intermediate nodes) within a configurable network may be adjusted or otherwise allocated based on household group information (238c) and/or classified IP addresses (234b). These resources are finite and so better household groups (238c) and/or classified IP addresses (234b) will enable a better network configuration and/or allocation of resources which in turn produces better network performance (e.g., faster delivery of content).

As is shown in this example, in some embodiments, a household group generator (e.g., 236) inputs a second set of classified IP addresses (e.g., 234a) and generates a household group (e.g., 238a) and content (e.g., 244) in a cache (e.g., 248) and is managed (e.g., by a cache manager (242)) based at least in part on the household group (e.g., 238b).

As is shown in this example, in some embodiments, a household group generator (e.g., 236) inputs a second set of classified IP addresses (e.g., 234a) and generates a household group (e.g., 238a) and a configuration associated with a configurable network (e.g., 254) is adjusted based at least in part on one or more of the following: the household group (e.g., 238c) or the second set of classified IP addresses (e.g., 234b).

Returning briefly to FIG. 1, step 100 refers to features and step 102 refers to inclusion criteria. The following figure describes a more detailed example of features and inclusion criteria.

Figure 3:
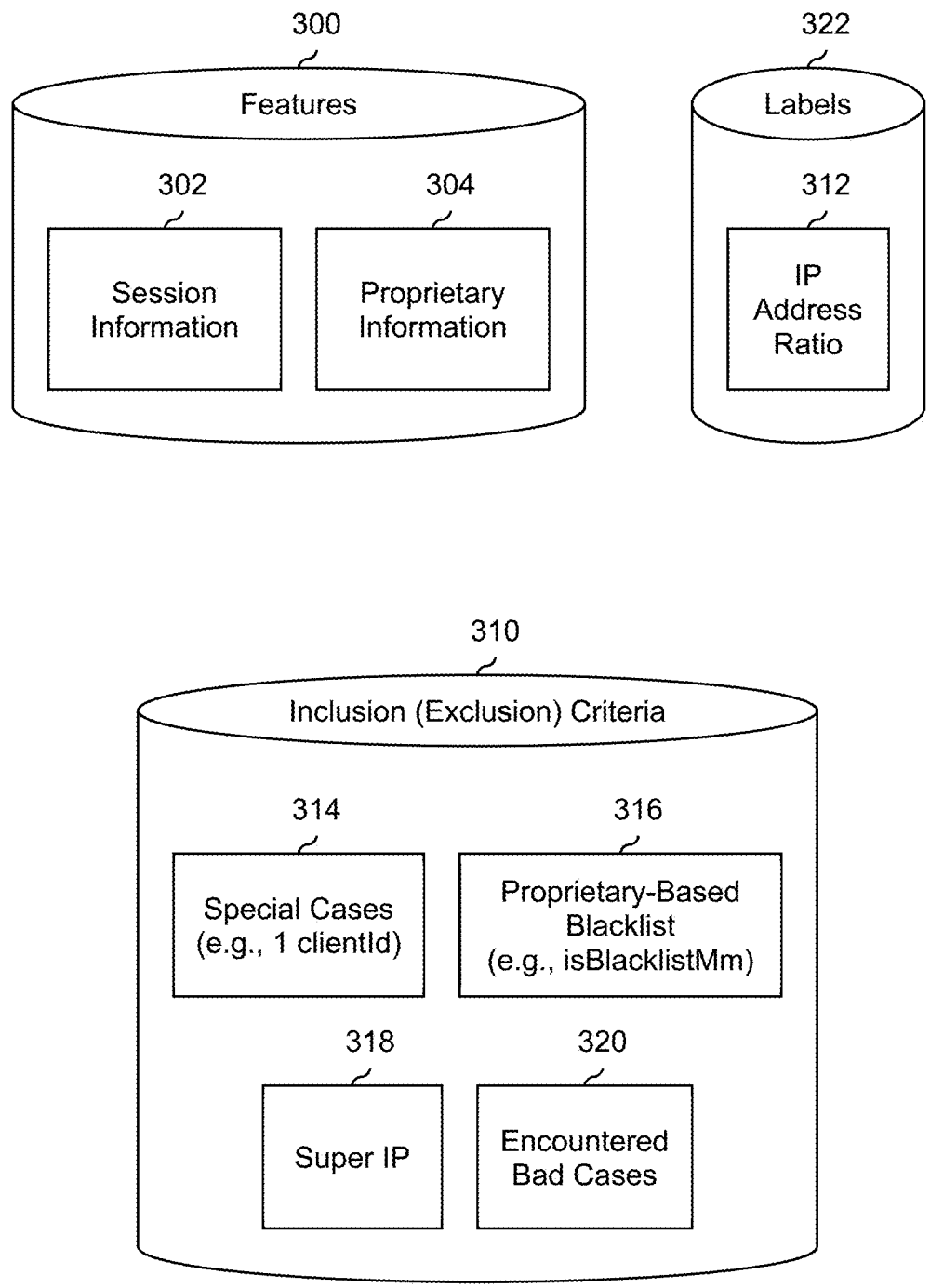
FIG. 3 is a diagram illustrating an embodiment of features, inclusion criteria, and labels.

FIG. 3 is a diagram illustrating an embodiment of features, inclusion criteria, and labels. As is shown in this example, in some embodiments, (a corresponding set of) features (e.g., 300) includes one or more of the following: session information (e.g., 302) or proprietary information (e.g., 304). As is shown in this example, in some embodiments, (a set of) inclusion criteria (e.g., 310) includes one or more of the following: a special case (e.g., 314), a proprietary-based blacklist (e.g., 316), a super IP (e.g., 318), or an encountered bad case (e.g., 320). As is shown in this example, in some embodiments, a label (e.g., 322) includes an IP address ratio (e.g., 312). In some embodiments, a piece of information falls into more than one category (e.g., in some embodiments, a super IP (318) may be considered a type of proprietary-based blacklist (316) if both are based on proprietary information (304)).

In this example, the features (300) include session information (302). For example, in some streaming applications, a session is established to stream content between a content source and a (e.g., streaming or playback) client on an end or destination device. In general, session information refers to metadata, (e.g., packet) header field values, and/or other information associated with such a session-based streaming event.

More specific examples of session summary information include a client identifier (e.g., associated with a client, such as an Internet browser application, which runs on a device and displays content), a viewer identifier, a subscriber identifier (e.g., associated with a subscription account), a session identifier, an IP address (such as a public IP address), geographic and/or location information, device metadata, video quality metrics, etc.

In various embodiments, session information (302) includes session summary information in various schema and/or formats. In some embodiments, session information (302) is obtained from and/or associated with a separate data source.

The following list includes 20 examples of session information (302) and/or features (300):

1) numNonStationaryDevices (i.e., a number of non-stationary devices (e.g., mobile deivices, smartphones, and laptops are classified as non-stationary devices while larger Smart TVs are classified as stationary) associated with a corresponding IP address over the measurement period.)
2) numDevices (i.e., a number of devices associated with a corresponding IP address over the measurement period)
3) deviceModelCountP99 (i.e., a (count at a)$99^{th}$ percentile of a device model count (distribution) associated with a corresponding IP address over the measurement period)
4) numMobileDevices (i.e., a number of mobile devices associated with a corresponding IP address over the measurement period)
5) deviceModelCountP95 (i.e., a (count at a)$95^{th}$ percentile of a device model count (distribution) associated with a corresponding IP address over the measurement period)
6) numBroadbandClientIds (i.e., a number of broadband client identifiers associated with a corresponding IP address over the measurement period)
7) clientCountMedian (i.e., a median value of a client identifier count (distribution) associated with a corresponding IP address over the measurement period)
8) ctvDeviceModelCountP99 (i.e., a (count at a)$99^{th}$ percentile of a connected TV (CTV; e.g., smart TVs, streaming devices, gaming consoles, etc.) device model count (distribution) associated with a corresponding IP address over the measurement period)
9) deviceModelCountMedian (i.e., a median value of a device model count (distribution) associated with a corresponding IP address over the measurement period)
10) clientIdCountP25 (i.e., a (count at a)$95^{th}$ percentile of a client identifier count (distribution) associated with a corresponding IP address over the measurement period)
11) numBroadbandclientIds_perDay (i.e., a number of broadband client identifiers per day associated with a corresponding IP address over the measurement period)
12) numPublishers (i.e., a number of (content) publishers associated with a corresponding IP address over the measurement period)
13) cellularSessionsPct (i.e., a percentage of cellular sessions (out of all sessions) associated with a corresponding IP address over the measurement period)
14) ctvDeviceModelCountP95 (i.e., a (count at a)$95^{th}$ percentile of a connected TV (CTV; e.g., smart TVs, streaming devices, gaming consoles, etc.) device model count (distribution) associated with a corresponding IP address over the measurement period)
15) numDevices_perDay (i.e., a number of devices per day associated with a corresponding IP address over the measurement period)
16) numClientId (i.e., a number of client identifiers associated with a corresponding IP address over the measurement period)
17) numBroadbandSessions (i.e., a number of broadband sessions associated with a corresponding IP address over the measurement period)
18) ctvDeviceModelCountP75 (i.e., a (count at a)$75^{th}$ percentile of a connected TV (CTV; e.g., smart TVs, streaming devices, gaming consoles, etc.) device model count (distribution) associated with a corresponding IP address over the measurement period)

In some embodiments, the above examples of session information (302) and/or features (300) are ordered according to importance where a higher importance corresponds to a given feature having a larger effect and/or weight when training the IP address classifier. To put it another way, importance may be indicative of the impact a given feature will have on the training of the IP address classifier.

As is shown from the first list (above), in some embodiments, a corresponding set of features includes one or more of the following: a number of broadband clients, a number of broadband sessions, a number of clients, a number of devices per day, a number of mobile devices, a number of non-stationary devices (e.g., laptops; streaming devices such as Roku®, Chromecast®, Amazon Fire® TV stick; etc.), a number of non-stationary clients, a number of publishers, or a Boolean value describing whether the IP address is a shared IP address.

As is shown from the first list (above), in some embodiments, a corresponding set of features includes one or more of the following: a median of a client count, a percentile of a client count, a percentile of a connected TV device model count, a median of a device model count, a percentile of a device model count, or a percentage of cellular sessions out of all sessions.

A second and longer list of examples of session information (302) and/or features (300) follows. For brevity, this second list (below) does not include descriptions for every feature, but the meaning of each feature is apparent from the abbreviated names and the descriptions from the first, shorter list (above).

1) ip:string (e.g., for IPv4, publicIp used as a string; for IPv6, the first 8 elements of the publicIpv6 used as a string (e.g., comma separated))
2) numSessions:long
3) numStationarySessions:long
4) numNonStationarySessions:long
5) numDesktopSessions:long
6) numPhoneSessions:long
7) numTabletSessions:long
8) numCellularSessions:long
9) numBroadbandSessions:long
10) playMins:double
11) playMinsStationary:double
12) playMinsNonStationary:double
13) playMinsDesktop:double
14) playMinsPhone:double
15) playMinsTablet:double
16) playMinsCellular:double
17) playMinsBroadband:double
18) stationarySessionsPct:double
19) nonStationarySessionsPct:double
20) desktopSessionsPct:double
21) phoneSessionsPct:double
22) tabletSessionsPct:double
23) cellularSessionsPct:double
24) broadbandSessionsPct:double
25) numDevices:long
26) numStationaryDevices:long
27) numDesktopDevices:long 28) numMobileDevices:long
29) numTabletDevices:long
30) numNonStationaryDevices:long
31) numPublishers:long
32) numClientIds:long
33) numStationaryClientIds:long
34) numNonStationaryClientIds:long
35) numDesktopClientIds:long
36) numPhoneClientIds:long
37) numTabletClientIds:long
38) numCellularClientIds:long
39) numBroadbandClientIds:long
40) numAssets:integer
41) deviceModelCountP25:long
42) deviceModelCountMedian:long
43) deviceModelCountP75:long
44) deviceModelCountP95:long
45) deviceModelCountP99:long
46) clientIdCountP25:long
47) clientIdCountMedian:long
48) clientIdCountP75:long
49) clientIdCountP95:long
50) clientIdCountP99:long
51) ctvDeviceModelCountP25:long
52) ctvDeviceModelCountMedian:long
53) ctvDeviceModelCountP75:long
54) ctvDeviceModelCountP95:long
55) ctvDeviceModelCountP99:long
56) mobileDeviceModelCountP25:long
57) mobileDeviceModelCountMedian:long
58) mobileDeviceModelCountP75:long
59) mobileDeviceModelCountP95:long
60) mobileDeviceModelCountP99:long
61) pcvP25:long
62) pcvMedian:long
63) pcvP75:long
64) pcvP95:long
65) pcvP99:long
66) activeDays:long
67) ipSharing:long
68) numStationaryClientIds_perDay: double
69) numStationaryDevices_perDay: double
70) numDesktopDevices_perDay: double
71) numDevices_perDay: double
72) numBroadbandClientIds_perDay: double
73) numDesktopClientIds_perDay: double
74) numClientId_perDay: double Another type of feature (300) in this example is proprietary information (304). For example, some companies collect or otherwise assemble proprietary information and/or databases associated with IP addresses (e.g., using proprietary techniques and/or proprietary sources) and make this proprietary information available to subscribers or customers. In some embodiments, proprietary information (304) includes (e.g., for a given IP address) an associated Internet service provider (ISP), a connection type (e.g., Cable/DSL, cellular, etc.), and/or a user type (e.g., residential, non-residential, etc.). In some embodiments, proprietary information (304) includes or otherwise comprises an IP address geolocation database and/or web services (e.g., associated with an IP address). In some such embodiments, the proprietary information (304) facilitates lookups or searches of geolocation(s) based on IP address.

Although the proprietary information (304) may include a user type or other field where one of the possible values is residential, the proprietary information (304) may not necessarily be directly usable as a label because the accuracy of the proprietary information (304) may be (relatively) low. For example, suppose a range or block of IP addresses is used by a company, but the company moves offices and the block of IP addresses are reassigned. This is merely one example of why IP addresses are reassigned and there are many other scenarios or reasons why IP addresses are reassigned. The proprietary information (304) does not always reflect such changes in a timely manner and is often out of date.

In this example, labels (322) include an IP address ratio (312), which (in general) relates to a ratio that depends upon or is otherwise related to a given IP address. The inclusion criteria (310) include special cases (314), proprietary-based blacklist (316), super IP (318), and encountered bad cases (320). In some embodiments, inclusion criteria (310) are generated from one or more of the features (300). The following examples describe embodiments of features (300), inclusion criterion (310), and labels (322) in more detail.

EXAMPLE 1—IP Address Ratio (312)

In this example, if an IP address is identified to serve multiple accounts, then the reliability and/or relevance of that IP address to identify an individual account is reduced. This inverse proportionality is used in this example to generate a label (322) comprising a ratio (312) of same-account client identifier pairs to that of all possible client identifier pairs served by the IP address over the training period.

For example, suppose a first IP address (e.g., IP_addr_1) has served or is otherwise associated with five client identifiers (e.g., clid1, clid2, clid3, clid4, and clid5). Of those client identifiers, three client identifiers belong to or are associated with a first account identifier (e.g., client identifiers clid1, clid2, and clid3↔account vid1_cc1) and the other two client identifiers belong to or are associated with another account identifier (e.g., client identifiers clid4 and clid5↔account vid2_cc2). In some embodiments, instead of using account identifiers to generate the ratio, some other type of identifier is used (e.g., viewer, user, subscriber, etc.).

To put these pieces of information into context with FIG. 3, the first IP address (e.g., IP_addr_1), client identifiers (e.g., clid1, clid2, clid3, clid4, and clid5), and account identifiers (e.g., vid1_cc1 and vid2_cc2) are examples of and/or may be obtained from session information (302) in features (300).

Returning to the example generation of an IP address ratio criteria (312), the complete or total set of (e.g., all possible) client identifier pairs is: (clid1, clid2), (clid1, clid3), (clid1, clid4), (clid1, clid5), (clid2, clid3), (clid2, clid4), (clid2, clid5), (clid3, clid4), (clid3, clid5), and (clid4, clid5). To put it more succinctly, there are $\binom{5}{2}$ (i.e., 5 choose 2 or 5C2)=10 total client identifier pairs.

Of the client identifier pairs, the following are ones where both client identifiers in the pair are associated with the first account identifier (i.e., vid1_cc1): (clid1, clid2), (clid1, clid3), and (clid2, clid3). In other words, for account identifier vid1_cc1, there are $\binom{3}{2}$ (i.e., 3 choose 2 or 3C2)=3 same-account client identifier pairs.

The following client identifier pairs are ones where both client identifiers in the pair are associated with the second account identifier (i.e., vid2_cc2): (clid4, clid5). For account identifier vid2_cc2, there are $\binom{2}{2}$ (i.e., 2 choose 2 or 2C2)=1 same-account client identifier pairs.

Therefore, the ratio of same-account client identifier pairs to that of all possible client identifier pairs associated with IP_addr_1 in this example is:

$$\frac{\binom{3}{2}+\binom{2}{2}}{\binom{5}{2}} = \frac{3+1}{10} = \frac{4}{10}.$$

In some embodiments, this example of an IP address ratio (312) (specifically, a ratio of the number of same-account client identifier pairs to the number of total client identifier pairs) is used as a reliability value and/or label (322). For example, as noted above, the higher this ratio is, the less reliable the associated IP address is.

The following figure describes this example more formally and/or generally in a flowchart.

Figure 4:
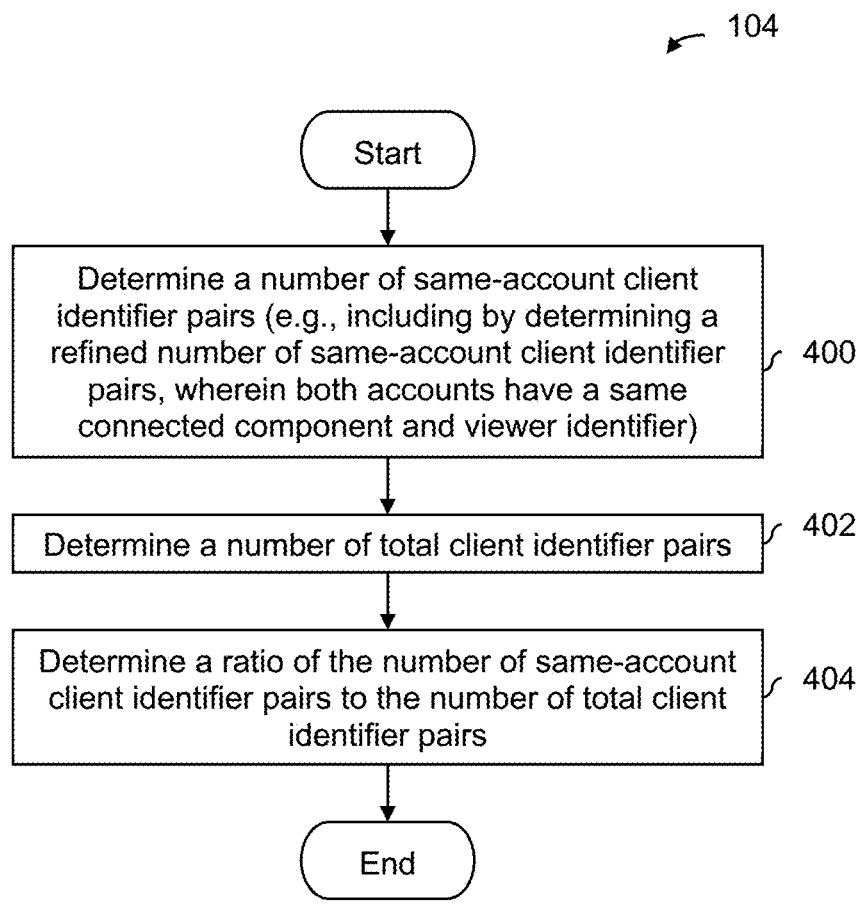
FIG. 4 is a flowchart illustrating an embodiment of a process to generate a reliability using an IP address ratio.

FIG. 4 is a flowchart illustrating an embodiment of a process to generate a reliability using an IP address ratio. In some embodiments, step 104 in FIG. 1 includes or is otherwise implemented using the process of FIG. 4.

At 400, a number of same-account client identifier pairs is determined. In the above example, $\binom{3}{2}+\binom{2}{2}=4$ for account identifiers vid1_cc1 and vid2_cc2.

At 402, a number of total client identifier pairs is determined. In the above example, $\binom{5}{2}=10$.

At 404, a ratio of the number of same-account client identifier pairs to the number of total client identifier pairs is determined (e.g., 4/10).

In some embodiments, the ratio (e.g., generated at 404) is output and is used in a label (e.g., as part of a process to generate a labeled training data set). In some embodiments, the ratio is used in further decision making or a subsequent transformation. For example, the ratio may be compared against a threshold. For example, the higher the ratio is, the less reliable and/or relevant the corresponding IP address is. As such, if the ratio is above the threshold, then the IP address in question is excluded from the labeled training data set (at least in this example).

Returning to FIG. 3, the following example describes a special case (314) in the inclusion criteria (310).

EXAMPLE 2—Special Cases (314)

In this example, IP addresses that are associated with a single client identifier are undesirable for training purposes because the information associated with such an IP address has low usefulness, not providing more useful information for the classification In some embodiments, any IP address that meets this criterion (i.e., an IP address that only services or is associated with a single client identifier) is excluded using the special cases (314) in inclusion criteria (310).

The following figure describes this example more formally and/or generally in a flowchart.

Figure 5:
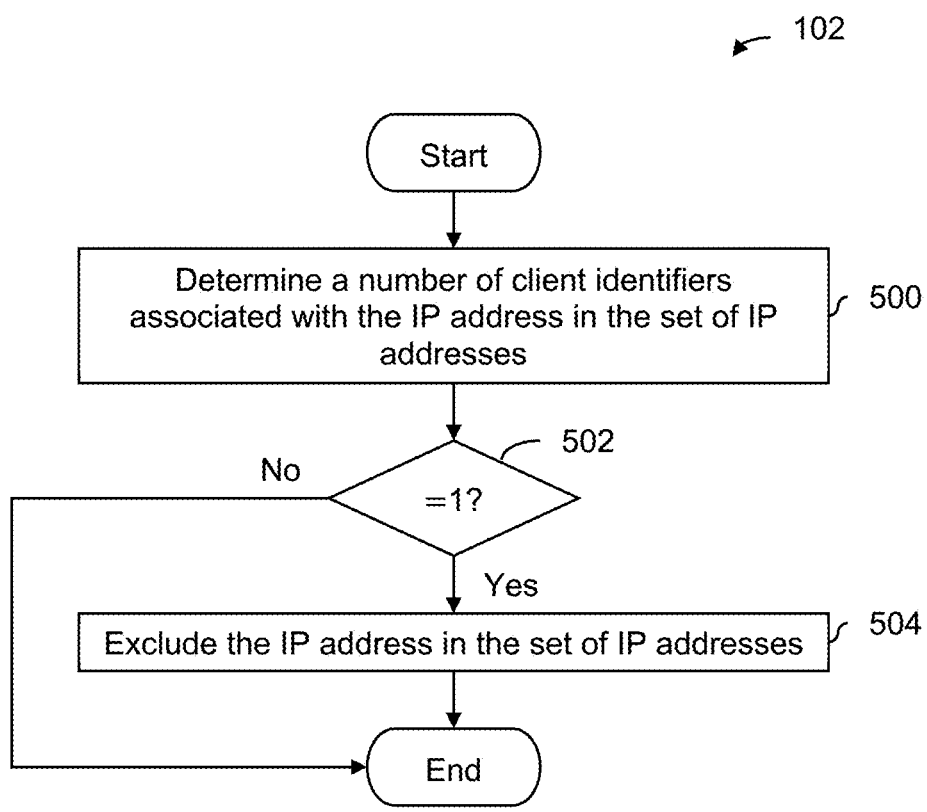
FIG. 5 is a flowchart illustrating an embodiment of a process to evaluate an IP address based on a special case, such as an IP address that is associated with a single client.

FIG. 5 is a flowchart illustrating an embodiment of a process to evaluate an IP address based on a special case, such as an IP address that is associated with a single client. In some embodiments, step 102 in FIG. 1 includes or is otherwise implemented using the process of FIG. 5.

At 500, a number of client identifiers associated with the IP address in the set of IP addresses is determined. To use the identifiers from the first example, the exemplary IP address (i.e., IP_addr_1) is associated with five (5) client identifiers (i.e., clid1-clid5).

At 502, there is a check if the number of client identifiers equals one (1). If so, at 504, the IP address in the set of IP addresses is excluded (e.g., from the labeled training data set). To put it another way, that data point may be dropped.

If the check at 502 results in a No, the process ends (i.e., and the IP address is not excluded).

For example, since IP_addr_1 serves or is otherwise associated with five (5) client identifiers (i.e., clid1-clid5), that IP address is not excluded (e.g., from the labeled training data set).

Returning to FIG. 3, the following example describes a proprietary-based blacklist (316) in the inclusion criteria (310).

EXAMPLE 3—Proprietary-Based Blacklist (316)

In this example, the proprietary information (304) in features (300) is used to generate a proprietary (information)-based blacklist (316) in the inclusion criteria (310). In this example, the proprietary-based blacklist (316) is a blacklist that is generated based at least in part on the proprietary information (304). For example, the proprietary information (304) may include the (e.g., name of the) ISP, the connection type, and a user type for a given IP address. In this example, if an IP address has a connection type other than Cable/DSL and a user type other than residential, then the proprietary-based blacklist (e.g., isBlacklistMm) is set to TRUE.

In other words, if connection_type=Cable/DSL, then isBlacklistMm is set to FALSE (e.g., independent of user_type). That is, an IP address is not blacklisted if connection_type=Cable/DSL (at least not at this point, based on the proprietary information). For example, this may be because an IP address with a Cable/DSL connection is a good (or at least better) data point for training compared to IP addresses with non-Cable/DSL connection types.

Similarly, if user_type=residential, then isBlacklistMm is set to FALSE (e.g., independent of connection_type). To put it another way, an IP address is not blacklisted (at least at this point, based on the proprietary information) if user_type=residential because an IP address associated with a residential user type may be a good (or at least better) data point for training compared to IP addresses with a non-residential user type.

In this example, the proprietary information (304) has low accuracy so in some embodiments, additional criteria (e.g., in addition to isBlacklistMm) is used to exclude an IP address from a labeled training data set. To put it another way, in some embodiments, isBlacklistMm is not sufficient to exclude an IP address from a labeled training data set. The following figure describes an example of this.

EXAMPLE 4—IP Address Ratio (312), Super IP (318), and Encountered Bad Cases (320)

For convenience, values associated with generating the exemplary reliability value are consolidated into Table 1 (shown below). Each row in the table may correspond to a data sample (e.g., obtained from and/or corresponding to a session used to exchange streaming content).

TABLE 1

Example values used to generate a reliability value for an IP address. For brevity, only data associated with IP_addr_1 is shown.

| IP Address | Client Identifier | Connected Component | Viewer Identifier | Comments |
|---|---|---|---|---|
| IP_addr_1 | clid1 | cc1 | vid1 | Parent 1 |
| IP_addr_1 | clid2 | cc1 | vid1 | Parent 1 |
| IP_addr_1 | clid3 | cc3 | vid2 | Parent 2 |

TABLE 1-continued

Example values used to generate a reliability value for an IP address.
For brevity, only data associated with IP_addr_1 is shown.

| IP Address | Client Identifier | Connected Component | Viewer Identifier | Comments |
|---|---|---|---|---|
| IP_addr_1 | clid4 | cc4 | vid3 | Child 1 (children share an account) |
| IP_addr_1 | clid5 | cc5 | vid3 | Child 2 (children share an account) |

In this example, a reliability value (gtCondition) is generated in multiple steps. First, connected components are identified, collected, or otherwise generated. For example, connected components may be generated using pairs of client identifiers and IP addresses (e.g., (clientId, IP)). The term "connected component" is a term used in graph theory, in which all the vertexes are reachable with edges. It is sometimes abbreviated as "cc", referring to a part of the graph that all the vertexes (that are IP addresses and clientIds) are reachable in the graph.

For example, as shown in Table 1, the client identifier and IP address pairs in this example are: (IP_addr_1, clid1), (IP_addr_1, clid2), (IP_addr_1, clid3), (IP_addr_1, clid4), and (IP_addr_1, clid5) for IP_addr_1. For those pairs, the connected components (e.g., devices) that clients clid1-clid5 run on (or are otherwise associated with) are determined. As shown in Table 1, clients clid1-clid5 correspond to connected components cc1, cc1, cc3, cc4, and cc5, respectively. For example, Parent 1 uses a single device (cc1) to obtain content or other information using a first client (clid1) and a second client (clid2). For example, the first client (clid1) may be associated with an Internet browser application and the second client (clid2) may be associated with a streaming service app.

Second, client identifier and connected component/viewer identifier (clientId-cc_vid) pairs are generated. In this example this is done by combining (e.g., appending or concatenating) a connected component (cc) with a viewer identifier (vid). Conceptually, combining a connected component (cc) with a viewer identifier (vid) creates a single data object (connected component/viewer identifier), which for brevity and/or simplicity is sometimes referred to herein as cc_vid. The connected component/viewer identifiers (cc_vid) are in turn used to generate pairs (e.g., (clientId, cc_vid)) of client identifiers (clientId) and connected components/viewer identifiers (cc_vid).

For context, a viewer identifier may not be completely reliable by itself (e.g., due to inaccuracy and/or contamination introduced by password sharing and/or a shared account). Therefore, in this example at least, an identity graph is run on (clientId, IP) pairs to obtain a component identifier (componentId) to be used as the connected component (cc) value (see the first step, above). The resulting cc_vid produced by this second step produces a better label (e.g., better able to identify an individual subscription, which may be desirable in at least some applications).

In Table 1, for example, both parents have their own viewer identifier (e.g., they have their own accounts, logins, and/or user credentials): vid1 and vid2. However, the children share a (e.g., single) viewer identifier: vid3. For the information shown in Table 1, the second step would output client identifier and connected component/viewer identifier (clientId, cc_vid) pairs of: (clid1, cc1_vid1), (clid2, cc1_vid1), (clid3, cc3_vid2), (clid4, cc4_vid3), and (clid5, cc5_vid3).

Third, all pairs of client identifiers (clientIdA, clientIdB) that share the same connected component/viewer identifier (cc_vid) are identified or otherwise generated (e.g., independent of IP address). For example, (clid1, cc1_vid1) and (clid2, cc1_vid1) both have the same connected component/viewer identifier (i.e., cc1_vid1) and so the pair (clid1, clid2) would be output.

Fourth, client identifier and client identifier (clientIdA, clientIdB) pairs that share a common IP address as well as connected component/viewer identifier (cc_vid) are output. For example, (clientId, IP) pair data is cross-referenced with the output from the third step to identify pairs where the IP address is used by both the first and second client identifier (clientIdA and clientIdB) in the pair. Note that the check for the same connected component/viewer identifier (cc_vid) was performed in the third step. This data is used to obtain or otherwise calculate a number (e.g., more accurate and/or true) of client identifier and client identifier pairs connected by the same IP address.

As noted above, for brevity, Table 1 only includes data for IP_address_1 so this step is negligible for this example collection of data. For completeness, it is noted that since both clid1 and clid2 in the pair (clid1, clid2) use and/or are associated with IP_address_1, the pair (clid1, clid2) passes the test.

To illustrate this point more clearly using subscript markups, the pair:

(clid1<subscript>IP_address_1</subscript>,
clid2<subscript>IP_address_1</subscript>)

would pass the test because both client identifiers (clid1 and clid2) are associated with the same IP address (IP_address_1) but the pair:

(clid1<subscript>IP_address_1</subscript>,
clid2<subscript>IP_address_2</subscript>)

would not pass the test because clid1 and clid2 are associated with IP_address_1 and IP_address_2, respectively, which are not the same.

Fifth, from the (clientId, IP) pair data, the total (e.g., possible) number of client identifier and client identifier (clientIdA, clientIdB) pairs associated with a given IP address is determined (e.g., without requiring both client identifiers to have the same cc_vid). From this total number, the ratio of the (e.g., refined) number of "true" pairs to the total number of pairs is used as the gtCondition value (e.g., which is in turn used as the label (322) and/or reliability value).

In some embodiments, IP addresses with high reliability will have gtCondition values closer to 1.

Turning briefly to FIG. 4, as is described in this example, in some embodiments, determining a number of same-account client identifier pairs includes determining a refined number of same-account client identifier pairs, wherein both accounts have a same connected component and viewer identifier (e.g., a same cc_vid).

In this example, the gtCondition generated above is discarded and/or the IP address is excluded from the labeled training data set if the IP address is identified as a super IP. Conceptually, a super IP is associated with a lot of client identifiers (clientIds). Quantitatively, in this example, the super IP criteria (318) are:

1) ipSharing>1000; OR
2) numBroadbandClientIds>500; OR
3) (numClientId>500) AND (ipSharing>1).

where ipSharing is the number of client identifiers (clientIds) sharing the same IP address. If any of the above super IP criterion is satisfied, then gtCondition is discarded or otherwise not generated and/or the IP address is excluded.

In this example, the gtCondition generated above is discarded and/or the IP address is excluded if the IP is an encountered bad case. Conceptually, an encountered bad case represents or otherwise indicates that the IP address in question cannot be reliably determined as residential or non-residential. Quantitatively, in this example, encountered bad case criteria (320) are:
1) (isBlacklistMm=TRUE AND cellularSessionsPct>0.5 AND numDevices>50); OR
2) (numDevices>50) AND (ipSharing>1).

If any of the above encountered bad case criterion is satisfied, then gtCondition is discarded or otherwise not generated and/or the IP address is excluded. It is noted that isBlacklistMm in this example is obtained or otherwise generated as described above in the third example (which describes a proprietary-based blacklist (316)).

In some embodiments, a gtCondition value is not able to be generated for all IP addresses, because a subscription identifier may only be available for some accounts. For example, suppose that among the 1.2B IP (e.g., IPv4+IPv6 Prefix) addresses encountered every month, only 50M IP address can be found with the subscription identifier enabled accounts. Even among this 50M, some IP address will be sparsely used and the label thus calculated may not be accurate (e.g., weak labels). In some embodiments, by training using the labels versus the features, the model is able to handle weak labels that are sparse and do not show similar behavior (e.g., because context is provided via the reliability value).

The usage of a super IP (318) or encountered bad case (320) as inclusion (or alternatively, exclusion) criteria (310) is described more generally and/or formally in flowcharts below.

Figure 6:
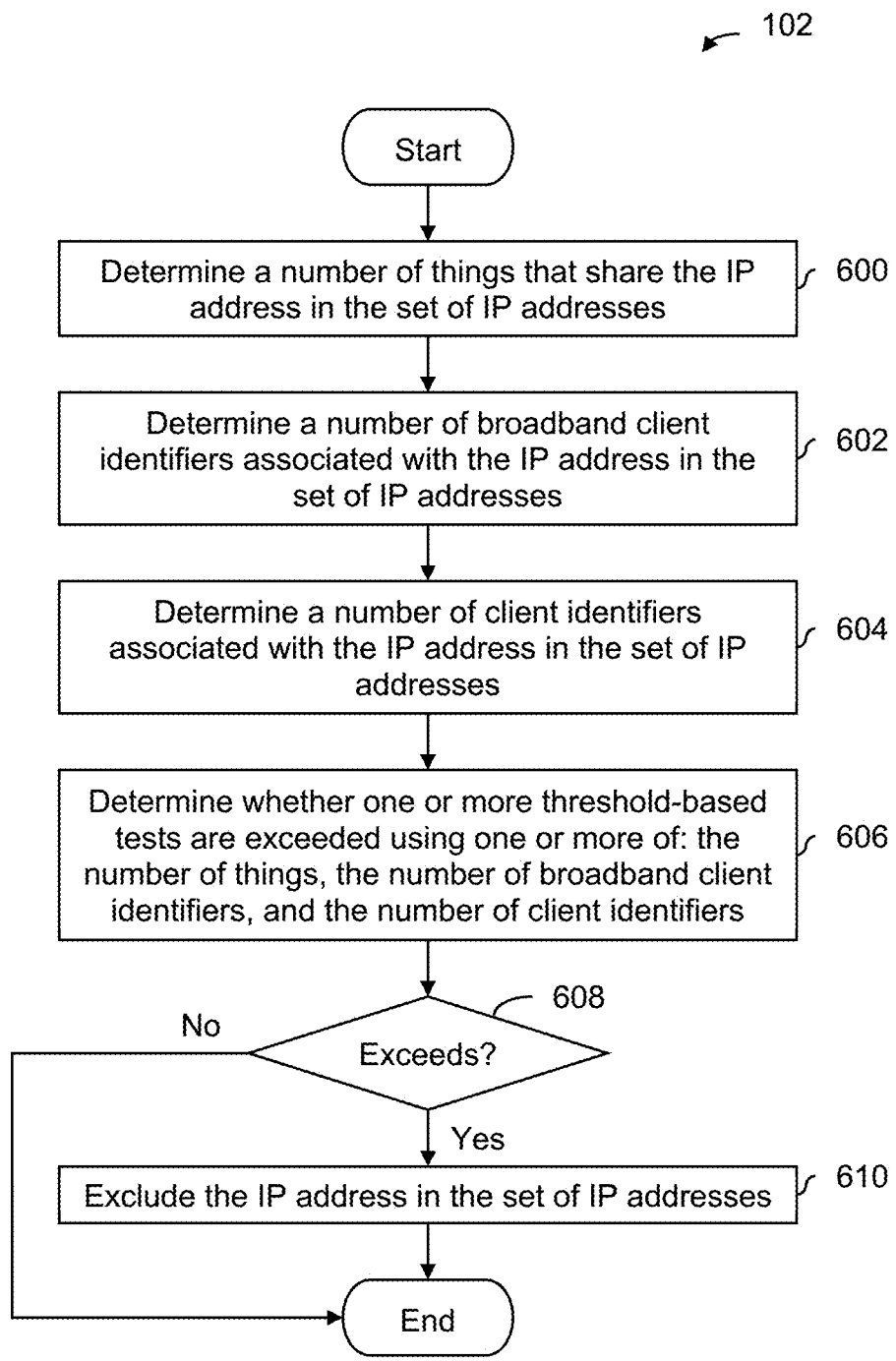
FIG. 6 is a flowchart illustrating an embodiment of a process to evaluate an IP address based on super IP criteria.

FIG. 6 is a flowchart illustrating an embodiment of a process to evaluate an IP address based on super IP criteria. In some embodiments, step 102 in FIG. 1 includes or is otherwise implemented using the process of FIG. 6.

At 600, a number of things that share the IP address in the set of IP addresses is determined (e.g., ipSharing). For example, the number may be of or based on viewer identifiers, client identifiers, connected components, etc.

At 602, a number of broadband client identifiers associated with the IP address in the set of IP addresses is determined (e.g., numBroadbandClientIds).

At 604, a number of client identifiers associated with the IP address in the set of IP addresses is determined (e.g., numClientId).

At 606, it is determined whether one or more threshold-based tests are exceeded using one or more of: the number of things, the number of broadband client identifiers, and the number of client identifiers. See, for example, the three super IP threshold-based tests described above. Note that in the third test, (numClientId>500) AND (ipSharing>1), so in some embodiments a threshold-based test includes two thresholds both being satisfied or otherwise met.

If it is exceeded at 608, then at 610, the IP address in the set of IP addresses is excluded (e.g., from the labeled training data set that is output, and/or the reliability value is discarded or not generated in the first place, etc.).

If the decision at step 608 is No (i.e., it is not exceeded), then the process ends (e.g., and the process skips the exclusion step at 610).

Figure 7:
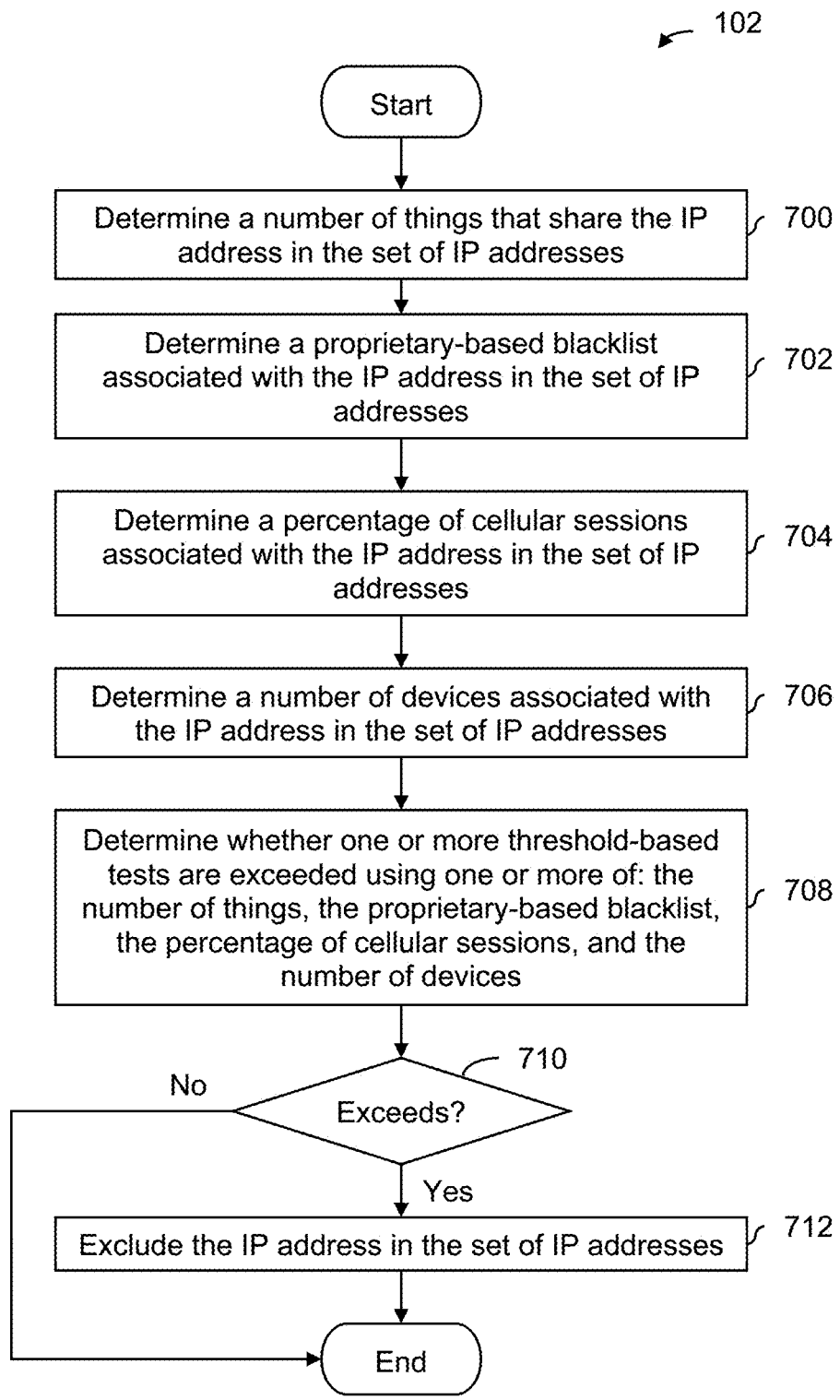
FIG. 7 is a flowchart illustrating an embodiment of a process to evaluate an IP address based on an encountered bad case.

FIG. 7 is a flowchart illustrating an embodiment of a process to evaluate an IP address based on an encountered bad case. In some embodiments, step 102 in FIG. 1 includes or is otherwise implemented using the process of FIG. 7.

At 700, a number of things that share the IP address in the set of IP addresses is determined (e.g., ipSharing).

At 702, a proprietary-based blacklist associated with the IP address in the set of IP addresses is determined (e.g., isBlacklistMm).

At 704, a percentage of cellular sessions associated with the IP address in the set of IP addresses is determined (e.g., cellularSessionsPct).

At 706, a number of devices associated with the IP address in the set of IP addresses is determined (e.g., numDevices).

At 708, it is determined whether one or more threshold-based tests are exceeded using one or more of: the number of things, the proprietary-based blacklist, the percentage of cellular sessions, and the number of devices. See, for example, the two encountered bad case threshold-based tests described above.

If it is exceeded at 710, then at 712, the IP address in the set of IP addresses is excluded (e.g., from the labeled training data set that is output, and/or the reliability value is discarded or not generated in the first place, etc.).

If the decision at step 710 is No (i.e., it is not exceeded), then the process ends (e.g., and the process skips the exclusion step at 712).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a memory; and
a processor coupled to the memory and configured to:
receive a set of Internet Protocol (IP) addresses, wherein each IP address in the set of IP addresses is associated with a corresponding set of features;
for an IP address in the set of IP addresses, evaluate the IP address based at least in part on a set of inclusion criteria;
for the IP address in the set of IP addresses, generate a likelihood that the IP address is residential or non-residential based at least in part on the corresponding set of features and the evaluation of the IP address based at least in part on the set of inclusion criteria;
for the IP address in the set of IP addresses, generate a training sample that includes the IP address, at least some of the corresponding set of features, and a label; and
output a labeled training data set that includes the training sample, wherein an IP address classifier is trained using the labeled training data set.

2. The system of claim 1, wherein:
the IP address classifier that is trained using the labeled training data set becomes a trained IP address classifier; and
the trained IP address classifier inputs a second set of unclassified IP addresses and outputs a second set of classified IP addresses.

3. The system of claim 2, wherein:
a household group generator inputs the second set of classified IP addresses and generates a household group; and
content in a cache is managed based at least in part on the household group.

4. The system of claim 2, wherein:
a household group generator inputs the second set of classified IP addresses and generates a household group; and
a configuration associated with a configurable network is adjusted based at least in part on one or more of the following: the household group or the second set of classified IP addresses.

5. The system of claim 1, wherein the corresponding set of features includes one or more of the following: a number of broadband clients, a number of broadband sessions, a number of clients, a number of devices per day, a number of mobile devices, a number of non-stationary devices, a number of non-stationary clients, a number of publishers, or a Boolean value describing whether the IP address is a shared IP address.

6. The system of claim 1, wherein the corresponding set of features includes one or more of the following: a median of a client count, a percentile of a client count, a percentile of a connected TV device model count, a median of a device model count, a percentile of a device model count, or a percentage of cellular sessions out of all sessions.

7. The system of claim 1, wherein the corresponding set of features includes one or more of the following: session information or proprietary information.

8. The system of claim 1, wherein the set of inclusion criteria includes one or more of the following: an IP address ratio, a special case, a proprietary-based blacklist, a super IP, or an is encountered bad case.

9. The system of claim 1, wherein evaluating the IP address based at least in part on the set of inclusion criteria includes:
determining a number of same-account client identifier pairs;
determining a number of total client identifier pairs;
determining a ratio of the number of same-account client identifier pairs to the number of total client identifier pairs; and
comparing the ratio against a threshold.

10. The system of claim 1, wherein evaluating the IP address based at least in part on the set of inclusion criteria includes:
determining a number of client identifiers associated with the IP address in the set of IP addresses; and
if the number of client identifiers equals one, excluding the IP address in the set of IP addresses.

11. The system of claim 1, wherein evaluating the IP address based at least in part on the set of inclusion criteria includes:
determining a number of things that share the IP address in the set of IP addresses;
determining a number of broadband client identifiers associated with the IP address in the set of IP addresses;
determining a number of client identifiers associated with the IP address in the set of IP addresses; and
determining whether one or more threshold-based tests are exceeded using one or more of: the number of things, the number of broadband client identifiers, and the number of client identifiers.

12. The system of claim 1, wherein evaluating the IP address based at least in part on the set of inclusion criteria includes:
determining a number of things that share the IP address in the set of IP addresses;
determining a proprietary-based blacklist associated with the IP address in the set of IP addresses;
determining a percentage of cellular sessions associated with the IP address in the set of IP addresses;
determining a number of devices associated with the IP address in the set of IP addresses; and
determining whether one or more threshold-based tests are exceeded using one or more of: the number of things, the proprietary-based blacklist, the percentage of cellular sessions, and the number of devices.

13. A method, comprising:
receiving a set of Internet Protocol (IP) addresses, wherein each IP address in the set of IP addresses is associated with a corresponding set of features;
for an IP address in the set of IP addresses, evaluating the IP address based at least in part on a set of inclusion criteria;
for the IP address in the set of IP addresses, generating a likelihood that the IP address is residential or non-residential based at least in part on the corresponding set of features and the evaluation of the IP address based at least in part on the set of inclusion criteria;
for the IP address in the set of IP addresses, generating a training sample that includes the IP address, at least some of the corresponding set of features, and a label; and
outputting a labeled training data set that includes the training sample, wherein an IP address classifier is trained using the labeled training data set.

14. The method of claim 13, wherein:
the IP address classifier that is trained using the labeled training data set becomes a trained IP address classifier; and
the trained IP address classifier inputs a second set of unclassified IP addresses and outputs a second set of classified IP addresses.

15. The method of claim 14, wherein:
a household group generator inputs the second set of classified IP addresses and generates a household group; and
content in a cache is managed based at least in part on the household group.

16. The method of claim 13, wherein the corresponding set of features includes one or more of the following: a median of a client count, a percentile of a client count, a percentile of a connected TV device model count, a median of a device model count, a percentile of a device model count, or a percentage of cellular sessions out of all sessions.

17. The method of claim 13, wherein the set of inclusion criteria includes one or more of the following: an IP address ratio, a special case, a proprietary-based blacklist, a super IP, or an encountered bad case.

18. The method of claim 13, wherein evaluating the IP address based at least in part on the set of inclusion criteria includes:
determining a number of same-account client identifier pairs;
determining a number of total client identifier pairs;
determining a ratio of the number of same-account client identifier pairs to the number of total client identifier pairs; and
comparing the ratio against a threshold.

19. The method of claim 13, wherein evaluating the IP address based at least in part on the set of inclusion criteria includes:
determining a number of client identifiers associated with the IP address in the set of IP addresses; and
if the number of client identifiers equals one, excluding the IP address in the set of IP addresses.

20. A computer program product embodied in a non-transitory computer readable medium and comprising computer instructions for:
- receiving a set of Internet Protocol (IP) addresses, wherein each IP address in the set of IP addresses is associated with a corresponding set of features;
- for an IP address in the set of IP addresses, evaluating the IP address based at least in part on a set of inclusion criteria;
- for the IP address in the set of IP addresses, generating a likelihood that the IP address is residential or non-residential based at least in part on the corresponding set of features and the evaluation of the IP address based at least in part on the set of inclusion criteria;
- for the IP address in the set of IP addresses, generating a training sample that includes the IP address, at least some of the corresponding set of features, and a label; and
- outputting a labeled training data set that includes the training sample, wherein an IP is address classifier is trained using the labeled training data set.

\* \* \* \* \*

UNITED STATES PATENT AND TRADEMARK OFFICE
CERTIFICATE OF CORRECTION

Page 1 of 1

| | |
|---|---|
| PATENT NO. | : 12,273,317 B1 |
| APPLICATION NO. | : 18/915880 |
| DATED | : April 8, 2025 |
| INVENTOR(S) | : Yan Li, Xi Xiong and Yasar Arafath Rafi Ahmed |

It is certified that error appears in the above-identified patent and that said Letters Patent is hereby corrected as shown below:

In the Specification

In Column 9, Line(s) 12, delete "deivices" and insert --devices--, therefor.

In Column 10, Line(s) 39, delete "public1p" and insert --publicIp--, therefor.

In Column 10, Line(s) 40, delete "public1pv6" and insert --publicIpv6--, therefor.

In Column 12, Line(s) 18, delete "criterion" and insert --criteria--, therefor.

In Column 13, Line(s) 48, after "classification", insert --.--.

In Column 15, Line(s) 54, delete "(component1d)" and insert --(componentId)--, therefor.

In the Claims

In Column 19, Line(s) 30, Claim 8, after "or an", delete "is".

Signed and Sealed this
Seventh Day of October, 2025

John A. Squires
*Director of the United States Patent and Trademark Office*